(No Model.)
B. S. CROCKER.
ELEVATING MACHINERY.
No. 552,987. Patented Jan. 14, 1896.
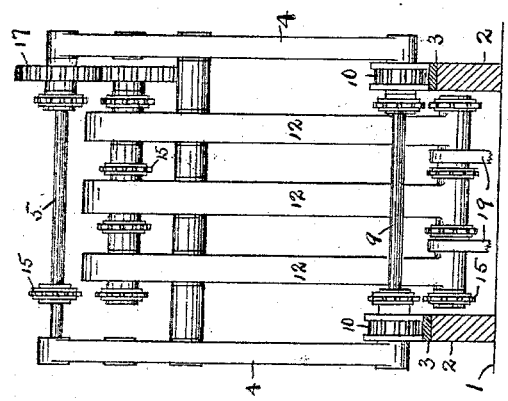
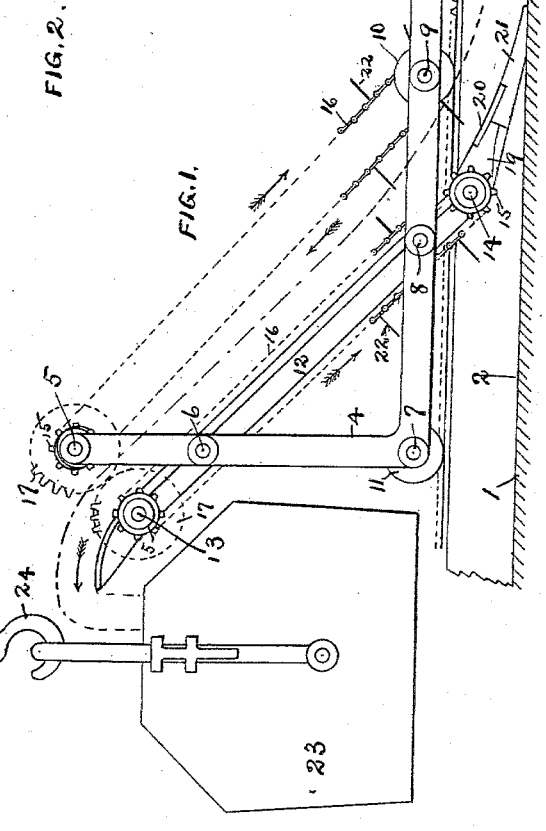
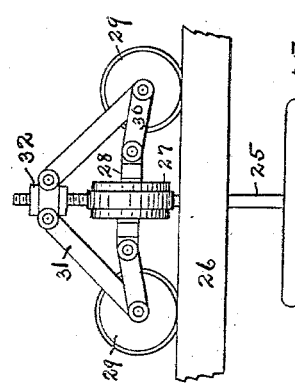
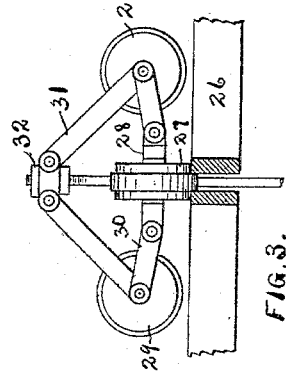
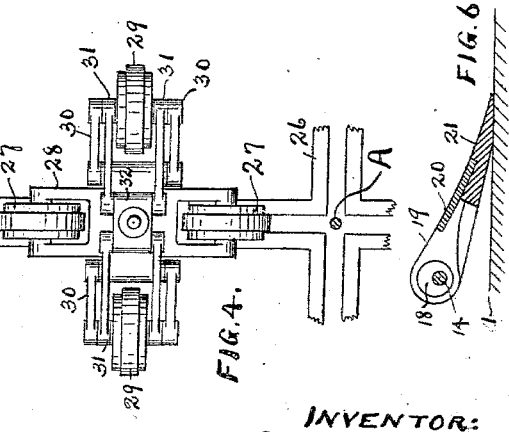
WITNESSES:
B. A. Mahony
G. H. Longard
INVENTOR:
Benjamin S. Crocker
By Casper L. Redfield
his Attorney

UNITED STATES PATENT OFFICE.

BENJAMIN S. CROCKER, OF CHICAGO, ILLINOIS.

ELEVATING MACHINERY.

SPECIFICATION forming part of Letters Patent No. 552,987, dated January 14, 1896.

Application filed June 26, 1895. Serial No. 554,127. (No model.)

*To all whom it may concern:*

Be it known that I, BENJAMIN S. CROCKER, a citizen of the United States, residing at Chicago, in the county of Cook and State of Illinois, have invented certain Improvements in Elevating Machinery, of which the following is a specification.

In the accompanying drawings, Figure 1 is a side elevation of machinery for scooping up and elevating gelatinous material like starch, together with the bucket and trolley for carrying the same. Fig. 2 is a front elevation of the elevating portion with the chains and scoop or plow removed. Fig. 3 is an elevation of the trolley similar to that in Fig. 1, except that it is shifted to run on a track at right angles to the track in Fig. 1. Fig. 4 is a plan of the trolley together with the track upon which it runs. Fig. 5 is a detail of the screw by which the trolley is shifted from one track to another, and Fig. 6 is a detail of the plow.

On the floor 1 are a series of troughs for the settling of starch that are formed by the side pieces 2. On the top of these side pieces are the racks 3 that serve both as a track and a means of communicating positive motion to gears constrained to move along the said track. Supported in the side frames 4 are a series of shafts 5, 6, 7, 8, and 9. On the shaft 9 are two gears 10, the shrouding of which runs on the sides of the rack 3 and the teeth of which engage the teeth of the rack. On the shaft 7 are two wheels 11 that are similar to the gears 10, except that the teeth are omitted. On the shafts 6 and 8 are inclined bars 12, near the ends of which are supported the shafts 13 and 14. Sprocket-wheels 15 and chains 16 connect the shafts 5 and 9 and 13 and 14, and gears 17 connect the shafts 5 and 13. On the shaft 14 are eccentrics 18, (see Fig. 6,) and on these are the arms 19. Connecting the arms 19 and extending to either side of them to a width equal to that of the trough formed by the side pieces 2 is a plate 20, and to this latter is secured a wooden tip 21. The parts 18 to 21 act as a vibrating plow to scoop the material out of the trough and deliver it to the conveyer-chains 16. On the links of these are projecting points 22 that enter the starch and insure its elevation by the movement of the chains. These points or "attachments" may be alike on all of the chains, but preferably those on the upper chains are connected together by slats in the ordinary manner, partly for the purpose of avoiding a multiplicity of chains and partly for the purpose of cutting the material so that it will fall into the bucket 23 in chunks.

The bucket 23 is supported by the swivel-hook 24 and rod 25 from a trolley that runs on the suspended track 26. This trolley consists of a pair of wheels 27 pivoted to the frame 28 and a pair of wheels 29 set at right angles to the first pair of wheels and pivoted to links 30 and 31 that are pivoted respectively to the frame 28 and a second frame 32. The rod 25 is enlarged at 33, where it is screwed into the frame 28, and is smaller again at 34, where it screws into the frame 32. One of these screws has a right-hand thread and the other has a left-hand thread, and the larger screw has a somewhat coarser pitch than the smaller one. The rod 25 is provided with a hand-wheel 35 that serves as a means of turning the screw 33 34 to draw together or separate the frames 28 and 32.

It will be observed that turning the hand-wheel 35 so that the screws will draw the frames 28 and 32 toward each other will cause the wheels 27 to rise with respect to wheels 29, and that turning the hand-wheel in the opposite direction will cause an opposite effect. If this be done at a time when the rod 25 is in the position A, Fig. 4, it will be evident that the trolley may be shifted from one track to another at right angles to it without going through the ordinary process of switching.

The operation is as follows: The end of the trough is cleared of material and the machine placed on the racks 3, with the plow-tip 21 in front and in a position to be inserted under the remaining material as soon as the machine is drawn forward. Power is applied from any suitable source by a rope 36 connected to the side frame 4 at the point 37. Advancing the machine by drawing on the rope 36 causes the gears 10 and shaft 9 to revolve, from whence the power is communicated through the upper chains 16, gears 17, and lower chains 16 to the shaft 14 and the eccentrics 18. The revolution of the eccentrics 18 causes a slight vibrating motion to the plow and facilitates the insertion of the point 21 under the gelatinous material, that hugs very close to the floor 1. As the material passes upward over the plate 20 it comes into contact with the points 22 on the chains 16, which, moving in the direction of the arrows, convey it upward until it drops over into the bucket 23. When a sufficient load has been deposited in the bucket, the trolley is run backward and transferred to the other track and run to the place of dumping. The main and branch tracks are shown as being at right angles to each other, and ordinarily they will be placed in this manner. They may, however, be placed at any other angle to each other and the trolley-wheels similarly set, or the different branch of tracks may be at different angles and the extra set of trolley-wheels be made to swivel on the first set. However this arrangement may be, the main idea of this part of the invention is to supply means for shifting a trolley and its load from one track to another when these tracks are at such an inclination to each other as to prevent the wheels from running directly from one to the other. By virtue of the different pitches of the screws 33 and 34, turning the hand-wheel 35 in one direction will cause the bucket to be raised, and turning it in the opposite direction will cause it to be lowered. The trolley is so set upon the track 26 that the bucket 23 will be at its highest position when being filled and its lowest position when being dumped on the other track. The object of this is to cause a slight fall of the bucket at the time of making the transfer, which fall acts to make the work of transferring under a load easier. The corresponding rise of the bucket occurs at the return-transfer when the bucket is empty and consequently easy to lift.

What I claim is—

1. The combination with a trough for holding material, a track along the sides of said trough, a frame work adapted to be moved along said track, and means for drawing said frame work forward, of elevating mechanism carried by said frame work and operated by the movement of the frame work along said track, a shaft carried by said frame work and also operated by the movement of the frame work along the track, eccentrics upon said shaft, and a plow the rear end of which is mounted on said eccentrics and its free end resting on the bottom of said trough.

2. The combination with a material holding trough and a track along the sides thereof, of elevating mechanism carried by a frame adapted to move along said track and be operated by such movement, a plow having its rear end pivoted upon a shaft carried by the frame work, and devices operated by the movement of said frame for giving the rear end of said plow a vibrating movement.

3. Elevating machinery supported upon a frame adapted to be moved along a track, devices for operating the elevating machinery from such movement, a plow having one end pivoted upon the frame work and adapted to turn upon such pivot, and means for giving said pivoted end a vibratory movement by power communicated from the movement of said frame along said track.

4. A rack, a gear adapted to run along said rack, elevating machinery supported by a frame work and operated by the movement of said gear, eccentrics also supported by said frame work and operated by said gear, and a plow mounted upon said eccentrics and given a vibratory motion therefrom.

5. Two tracks intersecting each other in such a manner as to prevent direct passage from one to the other, a trolley adapted to to run along such tracks and to be stopped at such intersection, devices carried by said trolley for transferring it from one track to the other, and connections extending below said tracks for operating the transferring devices.

6. A trolley provided with a double means of support upon a track, means for shifting the load carried by the trolley from either support to the other, and a connection from the trolley to a point below the track for operating the shifting mechanism.

7. A frame, trolley wheels pivoted thereto, a second frame connected to the first mentioned frame by a right and left hand screw, and a second pair of trolley wheels pivoted to links that are secured to the first and second frames respectively.

BENJAMIN S. CROCKER.

Witnesses:
CASPER L. REDFIELD,
JOHN M. MAHONY.